US008384659B2

(12) United States Patent
Yeo et al.

(10) Patent No.: US 8,384,659 B2
(45) Date of Patent: Feb. 26, 2013

(54) DISPLAY ELEMENT INCLUDING ELECTRODES AND A FLUID WITH COLORANT PARTICLES

(75) Inventors: Jong-Souk Yeo, Corvallis, OR (US); Pavel Kornilovich, Corvallis, OR (US); Brad Benson, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 254 days.

(21) Appl. No.: 12/815,811

(22) Filed: Jun. 15, 2010

(65) Prior Publication Data

US 2011/0304529 A1    Dec. 15, 2011

(51) Int. Cl.
*G09G 3/34* (2006.01)
(52) U.S. Cl. .......................... 345/107; 345/695
(58) Field of Classification Search .................. 345/107, 345/695; 349/139; 359/296
See application file for complete search history.

(56) References Cited

U.S. PATENT DOCUMENTS

| | | | | |
|---|---|---|---|---|
| 3,612,758 A * | 10/1971 | Evans et al. | ...................... | 348/803 |
| 4,203,106 A * | 5/1980 | Dalisa et al. | ..................... | 345/107 |
| 4,686,524 A * | 8/1987 | White | ............................. | 345/107 |
| 6,130,774 A | 10/2000 | Albert et al. | | |
| 6,538,801 B2 * | 3/2003 | Jacobson et al. | ............... | 359/296 |
| 6,680,726 B2 * | 1/2004 | Gordon et al. | ................. | 345/107 |
| 6,741,385 B2 | 5/2004 | Ikeda et al. | | |
| 6,781,745 B2 | 8/2004 | Chung et al. | | |
| 6,822,783 B2 | 11/2004 | Matsuda et al. | | |
| 6,873,451 B2 * | 3/2005 | Ukigaya | ....................... | 359/296 |
| 6,881,314 B1 * | 4/2005 | Wang et al. | .................... | 204/600 |
| 7,277,219 B2 * | 10/2007 | Ikeda | ............................. | 359/296 |
| 7,477,442 B2 | 1/2009 | Iwamatsu et al. | | |
| 8,040,326 B2 * | 10/2011 | Hotelling et al. | ............. | 345/173 |
| 8,089,686 B2 * | 1/2012 | Addington et al. | ........... | 359/296 |
| 8,089,687 B2 * | 1/2012 | Mabeck et al. | ................ | 359/296 |
| 2006/0193031 A1 | 8/2006 | Moore | | |
| 2006/0227097 A1 * | 10/2006 | Zhou et al. | ...................... | 345/107 |
| 2008/0314626 A1 | 12/2008 | Moore | | |
| 2009/0015545 A1 * | 1/2009 | Kato et al. | ...................... | 345/107 |
| 2009/0316253 A1 | 12/2009 | Fairley et al. | | |
| 2010/0182558 A1 * | 7/2010 | Lu et al. | ......................... | 349/141 |
| 2011/0102484 A1 * | 5/2011 | Yeo et al. | ....................... | 345/691 |

FOREIGN PATENT DOCUMENTS

| | | |
|---|---|---|
| WO | 2008010163 | 1/2008 |
| WO | 2009027915 | 3/2009 |
| WO | 2009106132 | 9/2009 |
| WO | 2009108187 | 9/2009 |

* cited by examiner

*Primary Examiner* — Sumati Lefkowitz
*Assistant Examiner* — Joseph Fox

(57) ABSTRACT

A display element includes a first electrode including conductive lines, a second electrode, and a dielectric layer on the first electrode. The dielectric layer has recess regions therein exposing at least portions of the conductive lines. The display element includes a fluid with colorant particles between the first electrode and the second electrode.

19 Claims, 16 Drawing Sheets

DISPLAY ELEMENT INCLUDING ELECTRODES AND A FLUID WITH COLORANT PARTICLES

BACKGROUND

Electrophoresis is the translation of charged objects in a fluid in response to an electric field. Electrophoretic inks are useful as a medium to enable bistable, low power types of displays. Conventional electrophoretic displays feature either black and white states (by exchanging white and black charged colorant particles at the top of the display cell) or white and colored states (by moving white colorant particles in a dyed fluid up and down electrophoretically). These conventional electrophoretic displays cannot be easily extended to provide full-color displays or large format displays.

DETAILED DESCRIPTION

Figure 1A:
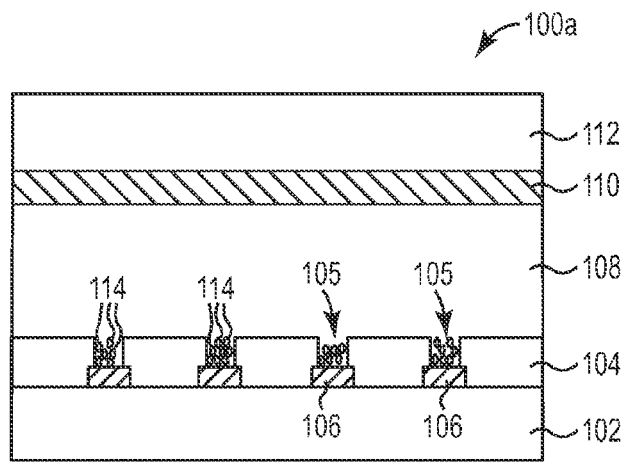
FIG. 1A illustrates a cross-sectional view of one embodiment of an electro-optical display.

In the following detailed description, reference is made to the accompanying drawings which form a part hereof, and in which is shown by way of illustration specific embodiments in which the disclosure may be practiced. In this regard, directional terminology, such as "top," "bottom," "front," "back," "leading," "trailing," etc., is used with reference to the orientation of the Figure(s) being described. Because components of embodiments of the present disclosure can be positioned in a number of different orientations, the directional terminology is used for purposes of illustration and is in no way limiting. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

As used herein, the term "over" is not limited to any particular orientation and can include above, below, next to, adjacent to, and/or on. In addition, the term "over" can encompass intervening components between a first component and a second component where the first component is "over" the second component.

As used herein, the term "adjacent" is not limited to any particular orientation and can include above, below, next to, and/or on. In addition, the term "adjacent" can encompass intervening components between a first component and a second component where the first component is "adjacent" to the second component.

As used herein, the term "electro-optical display" is an information display that forms visible images using one or more of electrophoresis, electro-convection, electrochemical interactions, and/or other electrokinetic phenomena.

As used herein, the term "grayscale" applies to both black and white images and monochromatic color images. Grayscale refers to an image including different shades of a single color produced by controlling the density of the single color within a given area of a display.

Embodiments provide electro-optical displays including conductive line, mesh, or lattice electrodes within the display cell. The conductive line, mesh, or lattice electrodes improve the speed, flexibility, and transparency of the electro-optical displays compared to conventional electro-optical displays where transparent conductors are used for the electrodes. In addition, in electro-optical displays utilizing gate electrodes and reservoir electrodes, the conductive line, mesh, or lattice electrodes improve control of the separation between the gate and reservoir electrodes. Further, for dual colorant electro-optical displays, the conductive line, mesh, or lattice electrodes can be arranged in various geometries optimized for electroconvective flow to provide additional independent control of the dual colorants. The conductive line, mesh, or lattice electrodes improve the optical and electrical performance of electro-optical displays, which can be used for electronic skin, electronic paper, and other applications. In one embodiment, the conductive line, mesh, or lattice electrodes are made of metal, silver nanowires, carbon nanotubes, or other suitable conductors. Metal line, mesh, or lattice electrodes can be made of gold, aluminum, nickel, copper, silver, platinum, other suitable metals, alloys thereof, multi-layer structures thereof, or combinations thereof.

In one embodiment, an electrokinetic display, which is based on the combined effect of electrophoretic and electro-hydrodynamic forces, includes conductive line, mesh, or lattice electrodes to connect exposed dot regions on a first side of the display and a transparent electrode on the other side of the display. The transparent electrode can be a plate electrode, a patterned electrode, and/or a segmented or pixelated electrode. In the case of a patterned, segmented, or pixelated electrode, the individual segments of the electrode can be addressed individually.

Metal line, mesh, or lattice electrodes use very thin metallic wires. By using very thin metallic wires, the compromise between the transparency and sheet resistance of the conducting materials (e.g., ITO, PEDOT) used for transparent electrodes is eliminated. For larger devices and signage applications, transparent conductors cannot provide a conductivity high enough to allow switching at interactive speeds (i.e., greater than a few tens of milliseconds). Therefore, the optical state of the entire display will not be updated at the same time, which leads to non-uniformity. Conductive line, mesh, and lattice electrodes enable the electrokinetic display architecture to be applied to large format display applications.

The conductive line, mesh, or lattice electrodes improve the transparency of electro-optical displays. The transparency is a function of the clear aperture defined as the area not occupied by conductive wires if the absorption through substrate and dielectric layers of the display is assumed to be negligible. In one embodiment, the line width of the conductive wires can be a few microns or sub-microns to maximize the clear aperture such that the transparency of the display is 90% or better.

FIG. 1A illustrates a cross-sectional view of one embodiment of an electro-optical display 100a. Electro-optical display 100a includes a first substrate 102, a dielectric layer 104 including recess regions 105, a first electrode 106, a display cell 108, a second electrode 110, and a second substrate 112. Display cell 108 is filled with a carrier fluid with colorant particles 114.

First substrate 102 is parallel to and opposite second substrate 112. In one embodiment, first substrate 102 or second substrate 112 include a reflective material. In another embodiment, first substrate 102 and/or second substrate 112 include an optically clear or transparent material, such as plastic (e.g., polyethylene terephthalate (PET)), glass, or other suitable material. In another embodiment, substrate 102 is coated with or comprises a reflective material. In yet another embodiment, substrate 102 is an opaque material. In still another embodiment, a light scatterer is formed on substrate 102.

First electrode 106 is a reservoir electrode and is parallel to and opposite second electrode 110. First electrode 106 includes segments of a segmented or pixelated conductor formed on substrate 102. First electrode 106 is made from any suitable conductor, such as a metal, silver nanowires, or carbon nanotubes. Second electrode 110 is a continuous, blanket, or solid plate electrode formed on second substrate 112. In other embodiments, second electrode 110 is segmented or pixelated similar to first electrode 106. In one embodiment, second electrode 110 is formed from a film of transparent conductive material. The transparent conductive material can include carbon nanotube layers, a transparent conducting oxide such as ITO (Indium Tin Oxide), or a transparent conducting polymer such as PEDOT (poly 3,4-ethylenedioxythiophene). Other embodiments use other materials that provide suitable conductivity and transparency for electro-optical display 100a.

Dielectric layer 104 is formed on substrate 102 and first electrode 106. Dielectric layer 104 is structured with recess regions 105 that allow charged colorant particles 114 to compact on exposed portions of first electrode 106 in response to a suitable bias being applied to first electrode 106 with respect to second electrode 110.

The carrier fluid within display cell 108 includes either polar fluids (e.g., water) or nonpolar fluids (e.g., dodecane). In other embodiments, anisotropic fluids such as liquid crystal is used. The fluid may include surfactants such as salts, charging agents, stabilizers, and dispersants. In one embodiment, the surfactants provide a fluid that is an electrolyte that is able to sustain current by ionic mass transport. In other embodiments, the fluid may include any suitable medium for enabling fluidic motion of charged particles.

Colorant particles 114 in the carrier fluid are comprised of a charged material in the case of an electrokinetic display. The colorant particle material should be able to hold a stable charge indefinitely so that repeated operation of the display does not affect the charge on the colorant particles. Colorant particle materials having a finite ability to hold a stable charge, however, can be used in accordance with the various embodiments while they maintain their charge. Colorant particles may have a size between several nanometers and several tens of microns and have the property of changing the spectral composition of the incident light by absorbing and/or scattering certain portions of the spectrum. As a result, the particles appear colored, which provides a desired optical effect. In other embodiments, the colorant can be a dye, which is comprised of single absorbing molecules.

Electro-optical display 100a is in a clear optical state. The clear optical state is provided by applying a negative bias to first electrode 106 relative to a reference bias applied to second electrode 110. The negative bias applied to first electrode 106 provides an electrophoretic pull that attracts positively charged colorant particles 114. As a result, colorant particles 114 are compacted on the surface of first electrode 106 within recess regions 105. With colorant particles 114 in clear fluid compacted on the surface of first electrode 106 in recess regions 105, the clear optical state is achieved.

The positively charged colorant particles 114 can be electrophoretically and convectively moved to first electrode 106 and held there by the negative bias applied to first electrode 106 relative to second electrode 110. In one embodiment, the convective flow is a transient effect caused by the ionic mass transport in the carrier fluid, without charge transfer between the carrier fluid and first electrode 106. In this case, the convective flow proceeds for a finite amount of time and facilitates the compaction of colorant particles 114 on first electrode 106 in recess regions 105. After compaction, colorant particles 114 are held on first electrode 106 within recess region 105 by electrostatic forces generated by a coupling with first electrode 106.

In another embodiment, the convective flow is induced by ionic mass transport in the carrier fluid and by charge transfer between the carrier fluid and first electrode 106 and second electrode 110. The charge transfer can occur when the carrier fluid is coupled to the electrodes either through direct contact with the electrodes or separated from the electrodes by an intermediate layer including one or more materials. In the latter case, charge transfer is facilitated by the internal electrical conductivity of the intermediate layer, either volumetric or via pinholes and other defects.

Figure 1B:
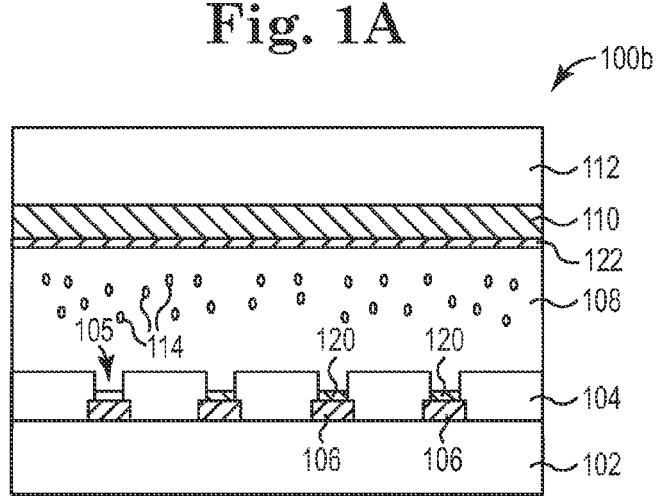
FIG. 1B illustrates a cross-sectional view of another embodiment of an electro-optical display.

FIG. 1B illustrates a cross-sectional view of another embodiment of an electro-optical display 100b. Electro-optical display 100b is similar to electro-optical display 100a previously described and illustrated with reference to FIG. 1A, except that electro-optical display 100b includes first dielectric passivation layers 120 and second dielectric passivation layer 122. First dielectric passivation layers 120 are self-aligned over first electrode 106 within recess regions 105 of dielectric layer 104. First dielectric passivation layers 120 are formed over first electrode 106 to electrically isolate first electrode 106 from display cell 108. In another embodiment, first dielectric passivation layer 120 can be formed continuously over first electrode 106 and substrate 102. Second dielectric passivation layer 122 is formed over second electrode 110 to electrically isolate second electrode 110 from display cell 108. In another embodiment, second dielectric passivation layer 122 can be excluded. First dielectric passivation layers 120 and/or second dielectric passivation layer 122 may include a reflective dielectric material or an optically clear or transparent dielectric material.

Electro-optical display 100b is in a spread color optical state having the color of colorant particles 114. The spread color optical state is provided by applying pulses or no bias to first electrode 106 relative to the reference bias applied to second electrode 110. The pulses or no bias applied to first electrode 106 spread colorant particles 114 throughout display cell 108. With colorant particles 114 in a clear fluid spread throughout display cell 108, the spread color optical state having the color of colorant particles 114 is achieved.

Figure 1C:
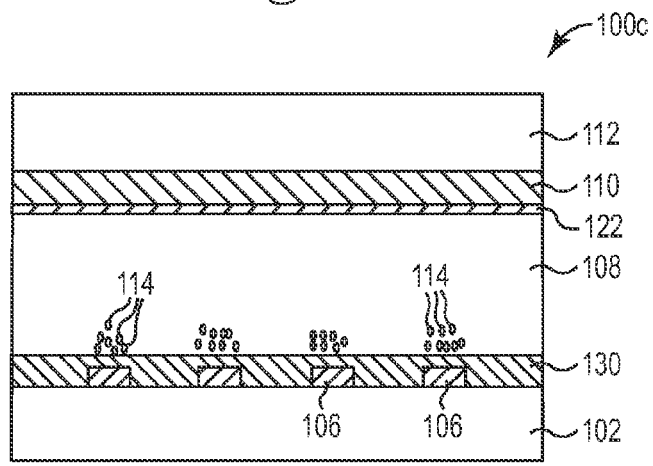
FIG. 1C illustrates a cross-sectional view of another embodiment of an electro-optical display.

FIG. 1C illustrates a cross-sectional view of another embodiment of an electro-optical display 100c. Electro-optical display 100c is similar to electro-optical display 100b previously described and illustrated with reference to FIG. 1B, except that in electro-optical display 100c dielectric layer 104 and first dielectric passivation layers 120 are replaced by dielectric passivation layer 130. Dielectric passivation layer 130 is formed over substrate 102 and first electrode 106 to electrically isolate first electrode 106 from display cell 108. Dielectric passivation layer 130 includes a reflective dielectric material or an optically clear or transparent dielectric material. Dielectric passivation layer 130 does not include recess regions for compacting colorant particles over first electrode 106. In other embodiments, dielectric passivation layer 130 may include recess regions for compacting colorant particles over first electrode 106.

Electro-optical display 100c is in the clear optical state. The clear optical state is provided by applying a negative bias to first electrode 106 relative to a reference bias applied to second electrode 110. The negative bias applied to first electrode 106 provides an electrophoretic pull that attracts positively charged colorant particles 114. As a result, colorant particles 114 are compacted on the surface of passivation layer 130 adjacent to first electrode 106. With colorant particles 114 in clear fluid compacted on the surface of passivation layer 103 adjacent to first electrode 106, the clear optical state is achieved.

Figure 2A:
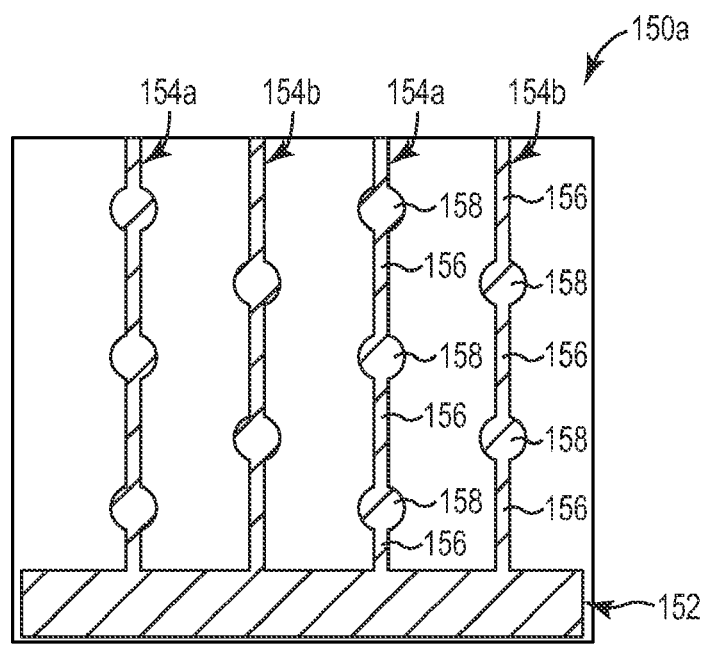
FIG. 2A illustrates a top view of one embodiment of an electrode for an electro-optical display.

FIG. 2A illustrates a top view of one embodiment of an electrode 150a for an electro-optical display. In one embodiment, electrode 150a is used to provide first electrode 106 previously described and illustrated with reference to FIGS. 1A-1C. Electrode 150a includes a conductive common contact region 152 and conductive lines 154a and 154b coupled to conductive common contact region 152. While a total of four lines 154a and 154b are illustrated in FIG. 2A coupled to common contact region 152, in other embodiments any suitable number of conductive lines can be coupled to common contact region 152.

Each conductive line 154a and 154b includes line regions 156 and dot regions 158. In one embodiment, dot regions 158 having a greater cross-sectional width than line regions 156. Each conductive line 154a and 154b is coupled to common contact region 152 via a line region 156. Each dot region 158 is connected to an adjacent dot region 158 by a line region 156. In one embodiment, each dot region 158 is aligned with a recess region 105 as previously described and illustrated with reference to FIG. 1A. Each line region 156 and common contact region 152 is covered by dielectric layer 104 as previously described and illustrated with reference to FIG. 1A. In the embodiment illustrated in FIG. 2A, dot regions 158 of each conductive line 154a are offset from dot regions 158 of each conductive line 154b. First conductive lines 154a and second conductive lines 154b alternate and are equally spaced from each other.

Figure 2B:
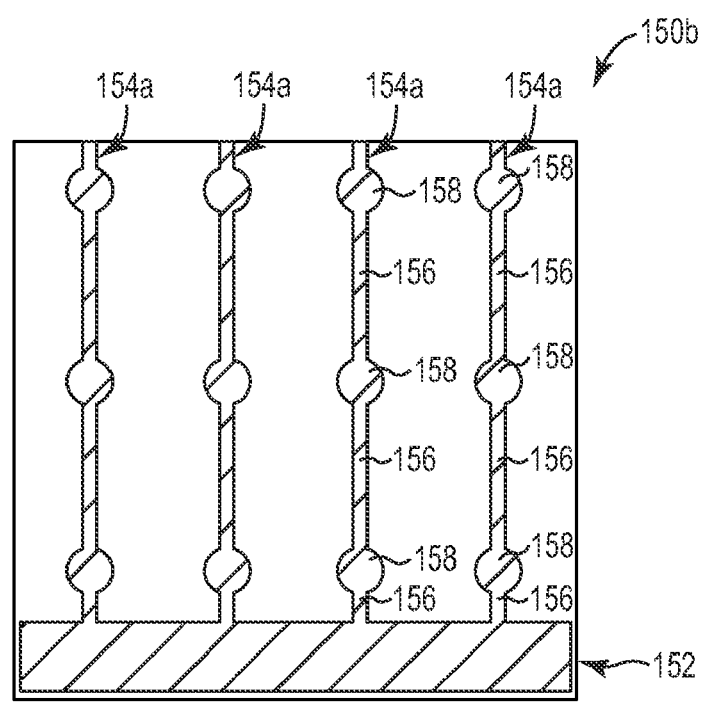
FIG. 2B illustrates a top view of another embodiment of an electrode for an electro-optical display.

FIG. 2B illustrates a top view of another embodiment of an electrode 150b for an electro-optical display. In one embodiment, electrode 150b is used to provide first electrode 106 previously described and illustrated with reference to FIGS. 1A-1C. Electrode 150b is similar to electrode 150a previously described and illustrated with reference to FIG. 2A, except that in electrode 150b conductive lines 154b are replaced with conductive lines 154a. Therefore, in this embodiment, dot regions 158 of adjacent conductive lines 154a are aligned.

Figure 2C:
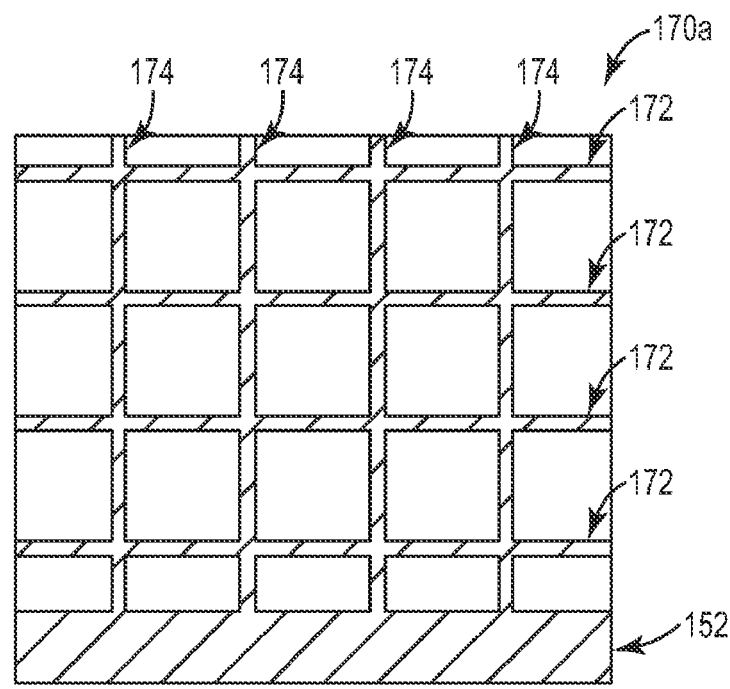
FIG. 2C illustrates a top view of another embodiment of an electrode for an electro-optical display.

FIG. 2C illustrates a top view of another embodiment of an electrode 170a for an electro-optical display. In one embodiment, electrode 170a is used to provide first electrode 106 previously described and illustrated with reference to FIGS. 1A-1C. Electrode 170a includes common contact region 152 and a mesh coupled to common contact region 152. The mesh includes first conductive lines 172 and second conductive lines 174. First conductive lines 172 are perpendicular to second conductive lines 174 to provide a mesh pattern. In one embodiment, the intersection of each first conductive line 172 and each second conductive line 174 is aligned with a recess region 105 as previously described and illustrated with reference to FIG. 1A. The remaining portions of first conductive lines 172 and second conductive lines 174 and common contact region 152 are covered by dielectric layer 104 as previously described and illustrated with reference to FIG. 1A.

Figure 2D:
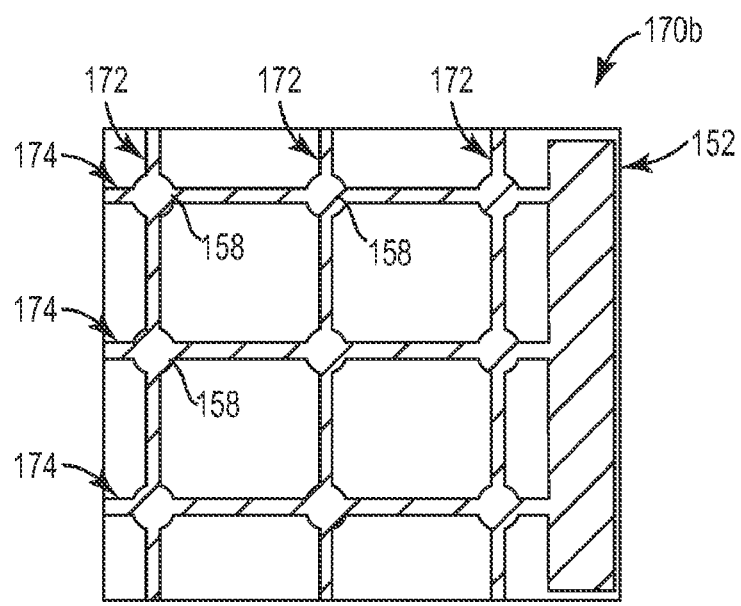
FIG. 2D illustrates a top view of another embodiment of an electrode for an electro-optical display.

FIG. 2D illustrates a top view of another embodiment of an electrode 170b for an electro-optical display. In one embodiment, electrode 170b is used to provide first electrode 106 previously described and illustrated with reference to FIGS. 1A-1C. Electrode 170b is similar to electrode 170a previously described and illustrated with reference to FIG. 2C, except that electrode 170b includes a dot region 158 at the intersection between each first conductive line 172 and each second conductive line 174. In one embodiment, each dot region 158 is aligned with a recess region 105 as previously described and illustrated with reference to FIG. 1A.

Figure 2E:
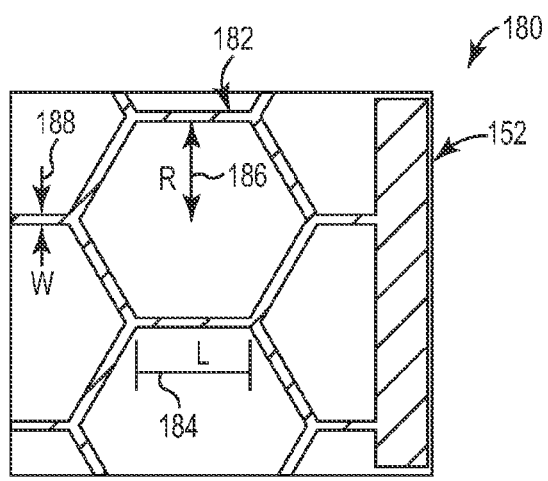
FIG. 2E illustrates a top view of another embodiment of an electrode for an electro-optical display.

FIG. 2E illustrates a top view of another embodiment of an electrode 180 for an electro-optical display. In one embodiment, electrode 180 is used to provide first electrode 106 previously described and illustrated with reference to FIG. 1C. Electrode 180 includes a conductive hexagonal lattice structure 182 coupled to common contact region 152.

The relative width and size of conductive hexagonal lattice structure 182 can be optimized to provide a clear aperture. In one embodiment, the width (W) 188 of each line segment is 4.0 µm, the length (L) 184 of each line segment is 73.5 µm, and the radius (R) 186 of each hexagon is 63.7 µm to provide a clear aperture of 94%. In another embodiment, the width (W) 188 of each line segment is 4.0 µm, the length (L) 184 of each line segment is 42.7 µm, and the radius (R) 186 of each hexagon is 37.0 µm to provide a clear aperture of 90%. In yet another embodiment, the width (W) 188 of each line segment is 4.0 µm, the length (L) 184 of each line segment is 29.5 µm, and the radius (R) 186 of each hexagon is 25.5 µm to provide a clear aperture of 86%. In other embodiments, other suitable values for W, L, and R are used to provide the desired clear aperture.

Figure 2F:
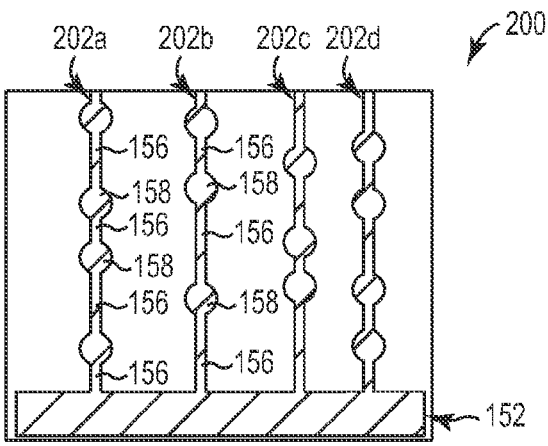
FIG. 2F illustrates a top view of another embodiment of an electrode for an electro-optical display.

FIG. 2F illustrates a top view of another embodiment of an electrode 200 for an electro-optical display. In one embodiment, electrode 200 is used to provide first electrode 106 previously described and illustrated with reference to FIGS. 1A-1C. Electrode 200 is similar to electrode 150a previously described and illustrated with reference to FIG. 2A, except that in electrode 200 conductive lines 154a and 154b are replaced by conductive lines 202a-202d. In this embodiment, the spacing between conductive lines 202a-202d varies aperiodically and the spacing between each dot region 158 along each conductive line 202a-202d also varies aperiodically.

Figure 2G:
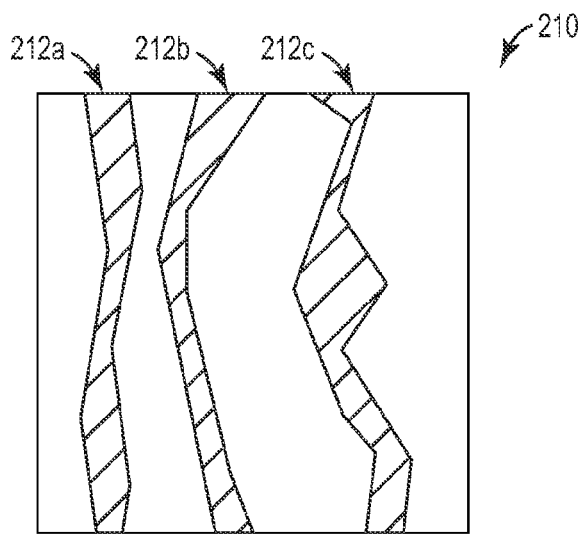
FIG. 2G illustrates a top view of another embodiment of an electrode for an electro-optical display.

FIG. 2G illustrates a top view of another embodiment of an electrode 210 for an electro-optical display. In one embodiment, electrode 210 is used to provide first electrode 106 previously described and illustrated with reference to FIGS. 1A-1C. Electrode 210 includes conductive lines 212a-212c. In this embodiment, the spacing between conductive lines 212a-212c varies aperiodically and the shape of each conductive line 212a-212c is distorted.

Figure 3A:
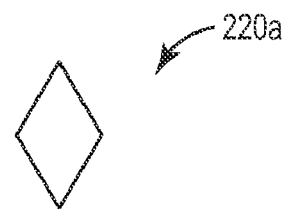
FIG. 3A illustrates a top view of one embodiment of a dot region of an electrode within an electro-optical display.

FIG. 3A illustrates a top view of one embodiment of a dot region 220a of an electrode within an electro-optical display. In one embodiment, dot region 220a is used in place of dot region 158 previously described and illustrated with reference to FIGS. 2A, 2B, 2D, and 2F. Dot region 220a is diamond shaped. In one embodiment, recess regions 105 within dielectric layer 104 previously described and illustrated with reference to FIG. 1A also have the same shape as dot region 220a.

Figure 3B:
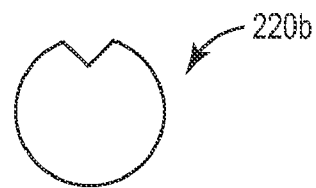
FIG. 3B illustrates a top view of another embodiment of a dot region of an electrode within an electro-optical display.

FIG. 3B illustrates a top view of another embodiment of a dot region 220b of an electrode within an electro-optical display. In one embodiment, dot region 220b is used in place of dot region 158 previously described and illustrated with reference to FIGS. 2A, 2B, 2D, and 2F. Dot region 220b is circular shaped with a single triangular portion removed. In one embodiment, recess regions 105 within dielectric layer 104 previously described and illustrated with reference to FIG. 1A also have the same shape as dot region 220b.

Figure 3C:
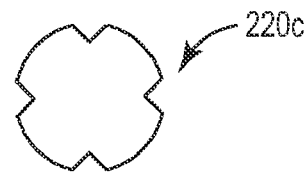
FIG. 3C illustrates a top view of another embodiment of a dot region of an electrode within an electro-optical display.

FIG. 3C illustrates a top view of another embodiment of a dot region 220c of an electrode within an electro-optical display. In one embodiment, dot region 220c is used in place of dot region 158 previously described and illustrated with reference to FIGS. 2A, 2B, 2D, and 2F. Dot region 220c is circular shaped with a four triangular portions removed. The removed triangular portions are equally spaced around dot region 220c. In one embodiment, recess regions 105 within dielectric layer 104 previously described and illustrated with reference to FIG. 1A also have the same shape as dot region 220c.

Figure 3D:
FIG. 3D illustrates a top view of another embodiment of a dot region of an electrode within an electro-optical display.

FIG. 3D illustrates a top view of another embodiment of a dot region 220d of an electrode within an electro-optical display. In one embodiment, dot region 220d is used in place of dot region 158 previously described and illustrated with reference to FIGS. 2A, 2B, 2D, and 2F. Dot region 220d is triangular shaped. In one embodiment, recess regions 105 within dielectric layer 104 previously described and illustrated with reference to FIG. 1A also have the same shape as dot region 220d.

Figure 3E:
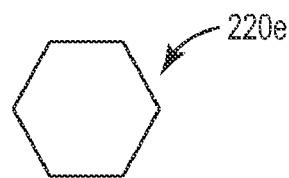
FIG. 3E illustrates a top view of another embodiment of a dot region of an electrode within an electro-optical display.

FIG. 3E illustrates a top view of another embodiment of a dot region 220e of an electrode within an electro-optical display. In one embodiment, dot region 220e is used in place of dot region 158 previously described and illustrated with reference to FIGS. 2A, 2B, 2D, and 2F. Dot region 220e is hexagon shaped. In one embodiment, recess regions 105 within dielectric layer 104 previously described and illustrated with reference to FIG. 1A also have the same shape as dot region 220e.

While FIGS. 3A-3E illustrate five embodiments of a dot region of an electrode within an electro-optical display, in other embodiments other suitable shaped dot regions are used.

Figure 4:
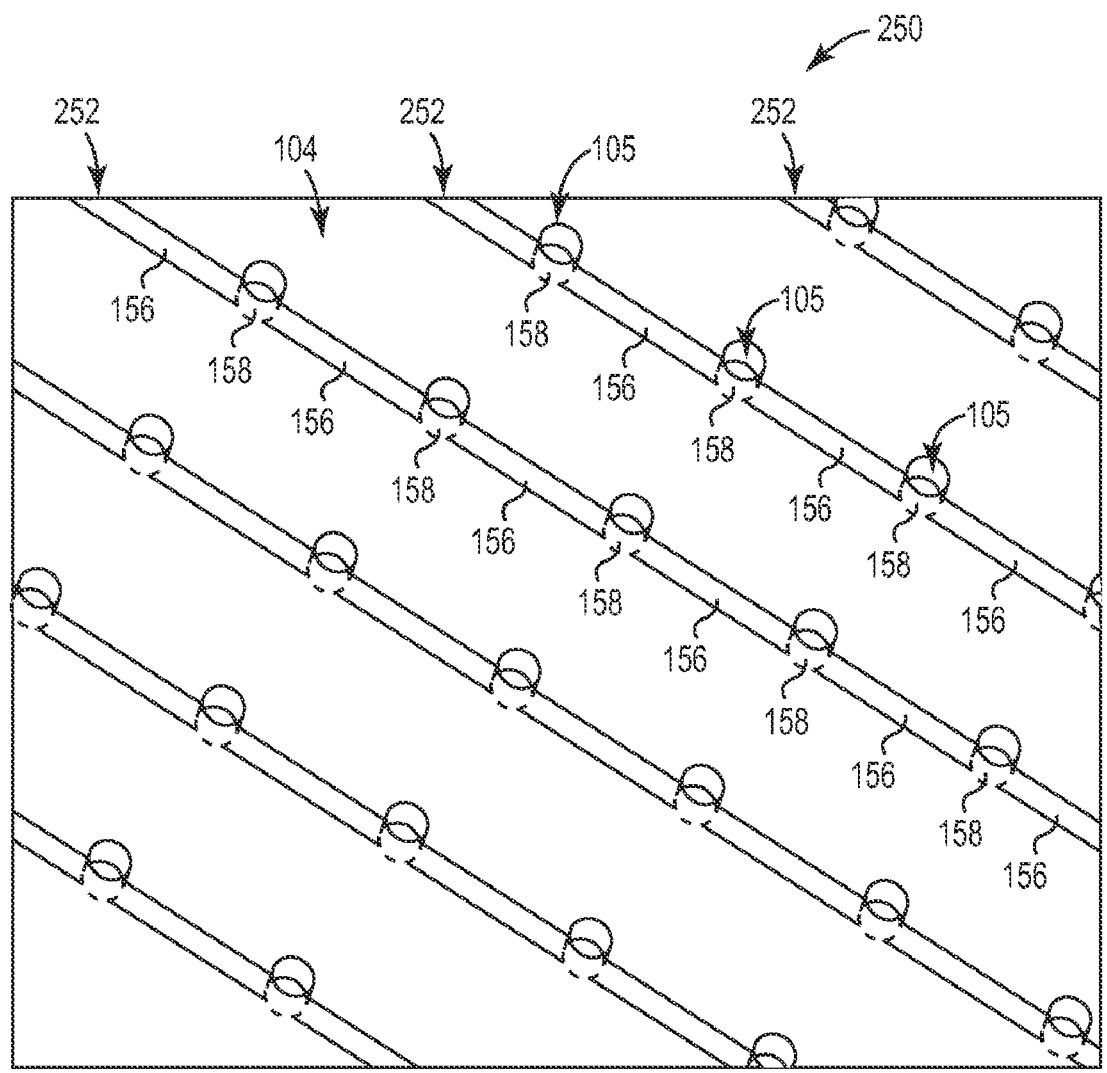
FIG. 4 illustrates a view of a portion of one embodiment of an electro-optical display.

FIG. 4 illustrates a view of a portion 250 of one embodiment of an electro-optical display. Portion 250 includes conductive lines 252 and dielectric layer 104. In one embodiment, conductive lines 252 provide first electrode 106 previously described and illustrated with reference to FIG. 1A. Each conductive line 252 includes dot regions 158 connected by line regions 156. Recess regions 105 are circular in shape and are formed in dielectric layer 104 to expose dot regions 158 of conductive lines 252. Recess regions 105 provide reservoir regions for colorant particles to compact in response to a suitable bias being applied to conductive lines 252. In other embodiments, dot regions 158 and recess regions 105 can have other suitable shapes, such as the shapes previously described and illustrated with reference to FIGS. 3A-3E.

Figure 5A:
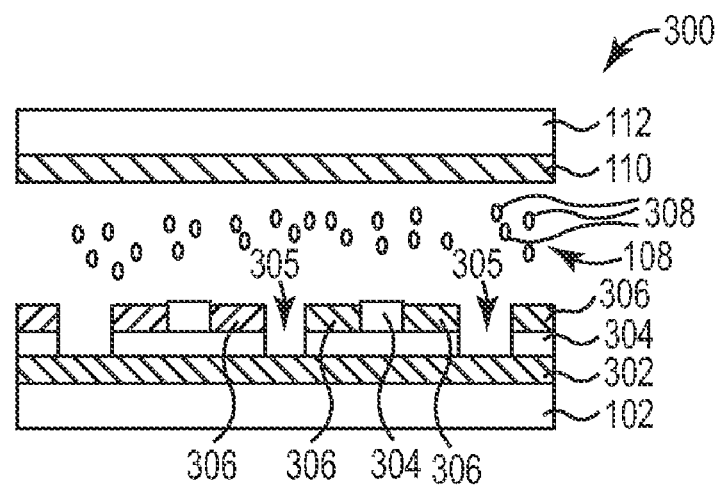
FIG. 5A illustrates a cross-sectional view of another embodiment of an electro-optical display.
Figure 5B:
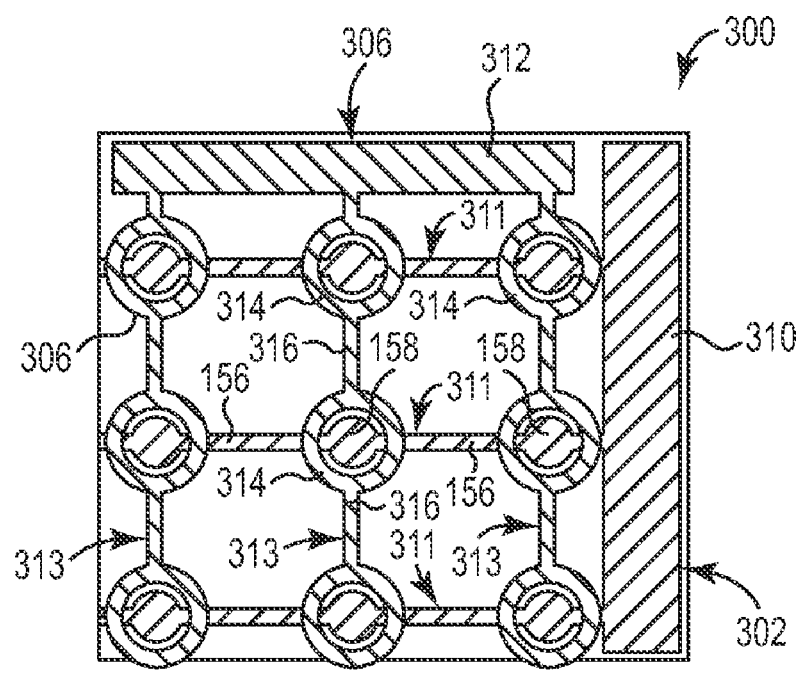
FIG. 5B illustrates a top view of one embodiment of electrodes for the electro-optical display illustrated in FIG. 5A.

FIG. 5A illustrates a cross-sectional view and FIG. 5B illustrates a top view of another embodiment of an electro-optical display 300. Electro-optical display 300 includes a first substrate 102, a first electrode 302, a dielectric layer 304 including recess regions 305, a display cell 108, a gate electrode 306, a second electrode 110, and a second substrate 112. Display cell 108 is filled with a carrier fluid with colorant particles 308. Gate electrode 306 is adjacent to the top of recess regions 305.

First electrode 302 is a reservoir electrode and includes a conductive common contact region 310 and conductive lines 311 coupled to common contact region 310. Conductive lines 311 include dot regions 158 and line regions 156 between dot regions 158. Gate electrode 306 includes a conductive common contact region 312 and conductive lines 313 coupled to common contact region 312. Conductive lines 313 include ring regions 314 and line regions 316 between ring regions 314. Each ring region 314 of gate electrode 306 surrounds a recess region 305 and is aligned with a dot region 158 of first electrode 302. In one embodiment, first electrode 302 and gate electrode 306 are made from the same conductive material. In one embodiment, first electrode 302 and gate electrode 306 are passivated by a dielectric passivation layer to electrically isolate first electrode 302 and gate electrode 306 from display cell 108.

Gate electrode 306 is used to control the movement of colorant particles 308 into and out of recess regions 305. Gate electrode 306 is used to control an amount of the colorant particles 308 released from recess regions 305 and moved into the wider portions of display cell 108. By controlling the amount of colorant particles 308 released from recess regions 305 of display cell 108 and moved into the wider portion of display cell 108, gate electrode 306 also controls the color perceived by a viewer of electro-optical display 300, including a variety of tones in the grayscale.

Figure 6A:
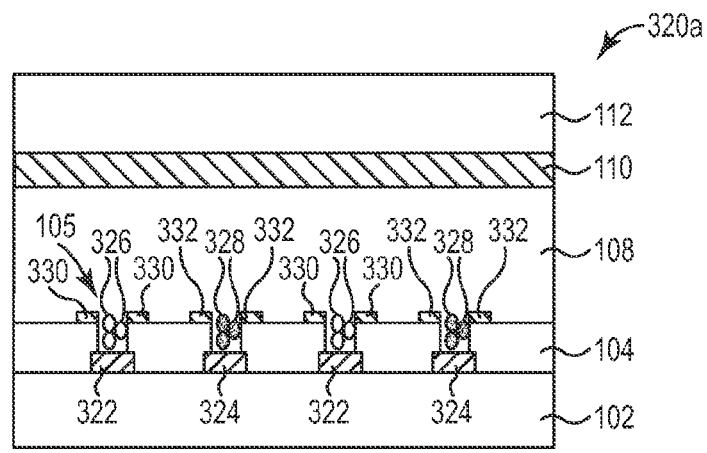
FIG. 6A illustrates a cross-sectional view of one embodiment of an electro-optical display in a clear optical state.

FIG. 6A illustrates a cross-sectional view of one embodiment of an electro-optical display 320a in a clear optical state. Electro-optical display 320a includes a first substrate 102, first electrodes 322 and 324, a dielectric layer 104 including recess regions 105, a display cell 108, gate electrodes 330 and 332, a second electrode 110, and a second substrate 112. Gate electrode 330 surround recess regions 105 above first electrode 322 and gate electrode 332 surround recess regions 105 above first electrode 324. Display cell 320a is filled with a carrier fluid with dual colorant ink including charged colorant particles 326 and 328.

Charged colorant particles 326 and 328 in dual colorant ink are oppositely charged and each provides a different color, such as cyan and magenta. Colorants in dual colorant ink can be any combination of primary subtractive or additive colorants, such as cyan, magenta, yellow, black, red, green, blue, and white. First electrode 322 and gate electrode 330 are used to control the movement of colorant particles 326, and first electrode 324 and gate electrode 332 are used to control the movement of colorant particles 328.

In the clear optical state, a positive bias is applied to first electrode 322, a negative bias is applied to first electrode 324, and no bias is applied to gate electrodes 330 and 332 relative to a reference bias applied to second electrode 110. The positive bias applied to first electrode 322 attracts negatively charged colorant particles 326 to compact on the surface of first electrode 322. The negative bias applied to first electrode 324 attracts positively charged colorant particles 328 to compact on the surface of first electrode 324. With colorant particles 326 and 328 compacted in recess regions 105, the clear optical state is achieved.

Figure 6B:
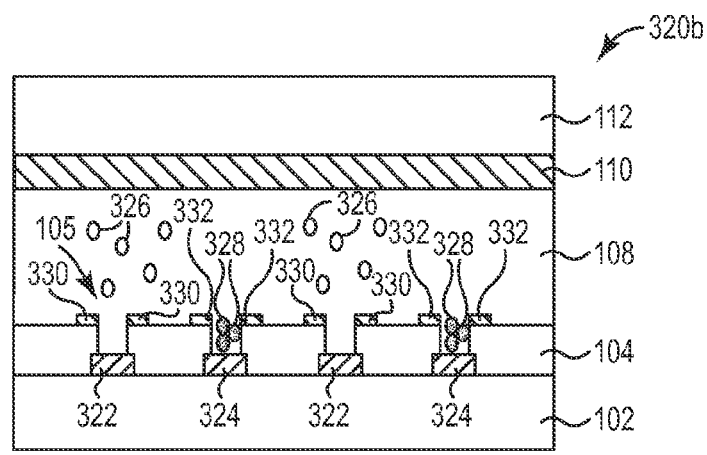
FIG. 6B illustrates a cross-sectional view of one embodiment of an electro-optical display in a first color optical state.

FIG. 6B illustrates a cross-sectional view of one embodiment of an electro-optical display 320b in a first color optical state. In the first color optical state, a negative bias is applied to first electrodes 322 and 324, a positive bias is applied to gate electrode 330, and no bias is applied to gate electrode 332 relative to a reference bias applied to second electrode 110. The negative bias applied to first electrode 322 and the positive bias applied to gate electrode 330 releases all negatively charged colorant particles 326 from recess regions 105 such that colorant particles 326 are spread within display cell 108. The negative bias applied to first electrode 324 attracts positively charged colorant particles 328 to compact on the surface of first electrode 324. With colorant particles 326 spread in display cell 108 and colorant particles 328 compacted in recess regions 105, the first color optical state having the color of colorant particles 326 is achieved.

Figure 6C:
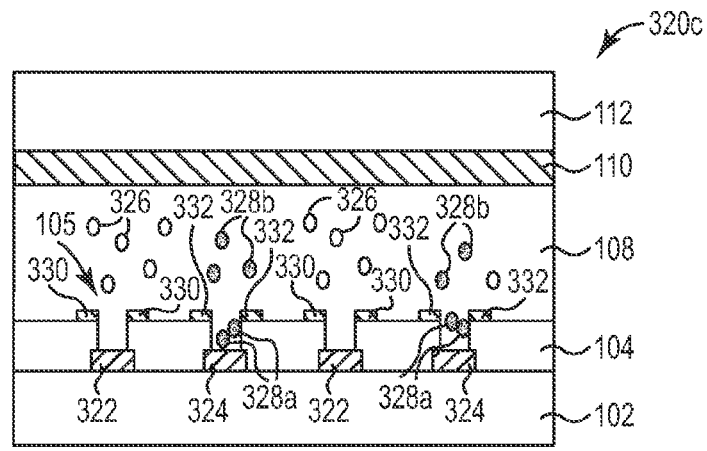
FIG. 6C illustrates a cross-sectional view of one embodiment of an electro-optical display in a second color optical state.

FIG. 6C illustrates a cross-sectional view of one embodiment of an electro-optical display 320c in a second color optical state. In the second color optical state, a negative bias is applied to first electrodes 322 and 324, a positive bias is applied to gate electrode 330, and a negative bias is applied to gate electrode 332 relative to a reference bias applied to second electrode 110. The negative bias applied to first electrode 322 and the positive bias applied to gate electrode 330 releases all positively charged colorant particles 326 from recess regions 105 such that colorant particles 326 are spread within display cell 108.

The negative bias applied to first electrode 324 and the negative bias applied to gate electrode 332 repel negatively charged colorant particles 328. Based on the negative bias applied to first electrode 324 and on the negative bias applied to gate electrode 332, the amount of colorant particles 328 released from recess regions 105 of display cell 108 adjacent to first electrode 324 can be controlled. As a result, some of colorant particles 328 remain in the recess regions 105 as indicated by colorant particles 328a and some of colorant particles 328 pass to the wider portion of display cell 108 as indicated by colorant particles 328b. With colorant particles 326 and 328b spread in display cell 108 and colorant particles 328a compacted in recess regions 105, the second color optical state having a color based on the combination of colorant particles 326 and 328b is achieved. In other embodiments, other color optical states can be achieved by controlling the amount of colorant particles 326 and 328 released from recess regions 105.

Figure 7A:
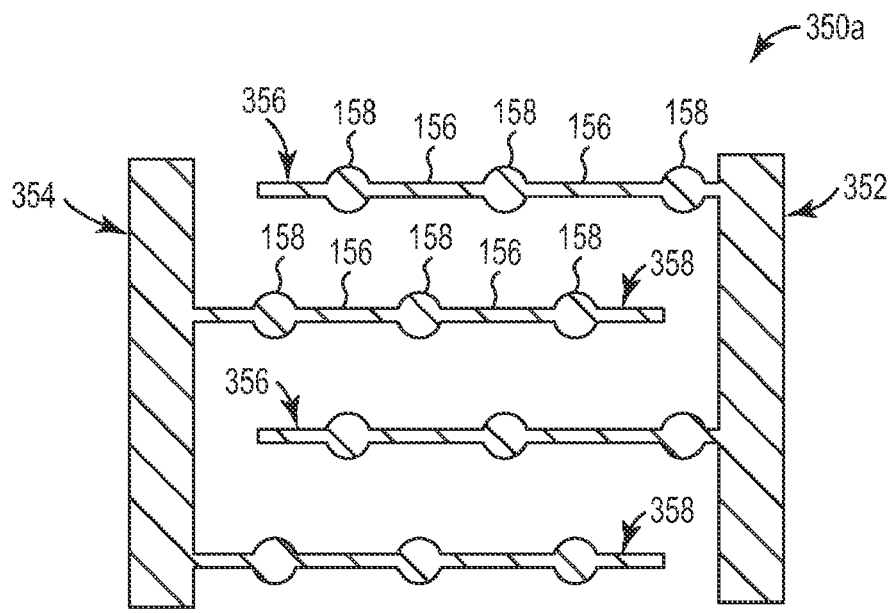
FIG. 7A illustrates a top view of one embodiment of electrodes for a dual color electro-optical display.

FIG. 7A illustrates a top view of one embodiment of electrodes 350a for a dual color electro-optical display. In one embodiment, electrodes 350a provide first electrodes 322 and 324 previously described and illustrated with reference to FIG. 6A. Electrodes 350a include conductive lines 356 coupled to a conductive common contact region 352 and conductive lines 358 coupled to a conductive common contact region 354. Each conductive line 356 and 358 includes dot regions 158 and line regions 156 between dot regions 158. In other embodiments, dot regions 158 are excluded. Common contact region 352 is parallel to and opposite to common contact region 354. Conductive lines 356 and 358 are interdigitated. Dot regions 158 of adjacent conductive lines 356 are aligned. Dot regions 158 of adjacent conductive lines 358 are aligned. Dot regions 158 of conductive lines 356 are offset from dot regions 158 of conductive lines 358. Common contact region 352 and conductive lines 356 are used to control the movement of one colorant and common contact region 354 and conductive lines 358 are used to control the movement of another colorant in a dual color electro-optical display.

Figure 7B:
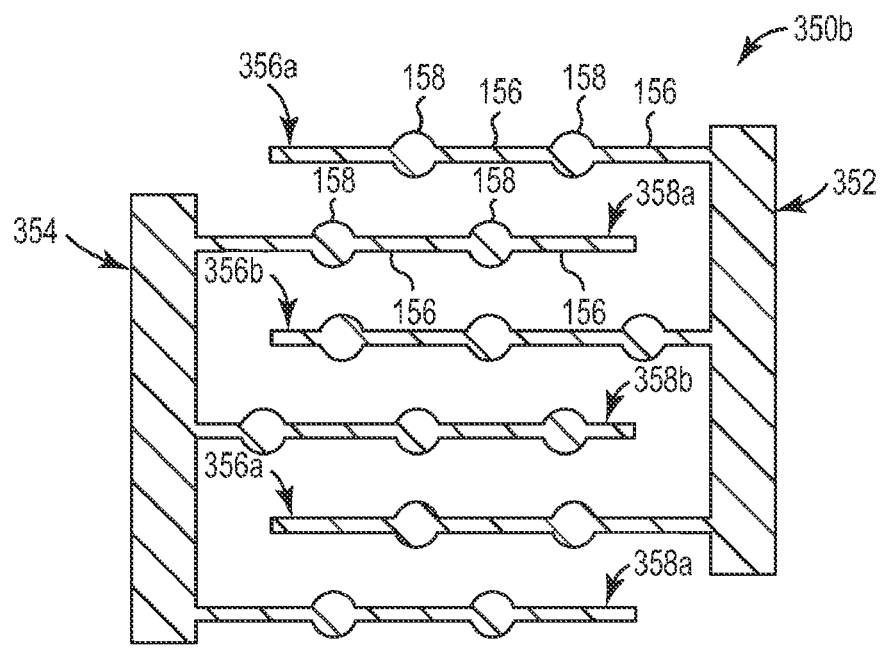
FIG. 7B illustrates a top view of another embodiment of electrodes for a dual color electro-optical display.

FIG. 7B illustrates a top view of another embodiment of electrodes 350b for a dual color electro-optical display. In one embodiment, electrodes 350b provide first electrodes 322 and 324 previously described and illustrated with reference to FIG. 6A. Electrodes 350b are similar to electrodes 350a previously described and illustrated with reference to FIG. 7A, except that electrodes 350b includes conductive lines 356a and 356b and conductive lines 358a and 358b.

Conductive lines 356a and 356b are coupled to common contact region 352. Dot regions 158 of conductive lines 356a are offset from dot regions 158 of conductive lines 356b. Conductive lines 358a and 358b are coupled to common contact region 354. Dot regions 158 of conductive lines 358a are offset from dot regions 158 of conductive lines 358b. Dot regions 158 of each conductive line 356a are aligned with dot regions 158 of each adjacent conductive line 358b. Dot regions 158 of each conductive line 356b are aligned with dot regions 158 of each adjacent conductive line 358a. Common contact region 352 and conductive lines 356a and 356b are used to control the movement of one colorant and common contact region 354 and conductive lines 358a and 358b are used to control the movement of another colorant in a dual color electro-optical display.

While FIGS. 7A and 7B illustrate specific combinations of interdigitated lines including dot regions and line regions, in other embodiments other suitable combinations can be provided to control the movement of colorants in a dual color electro-optical display.

Figure 8A:
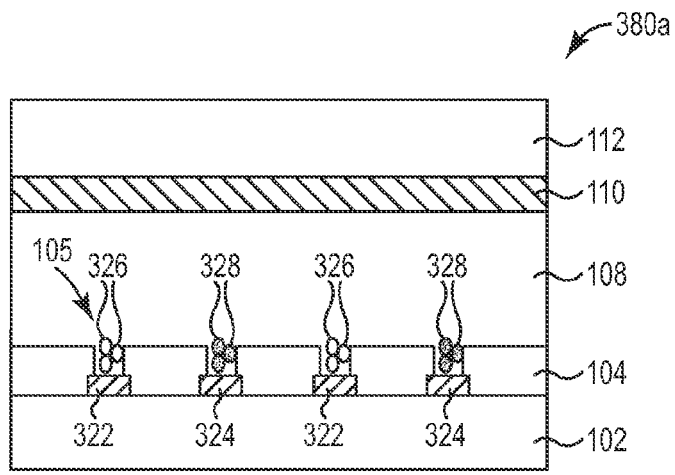
FIG. 8A illustrates a cross-sectional view of one embodiment of an electro-optical display in a clear optical state.

FIG. 8A illustrates a cross-sectional view of one embodiment of an electro-optical display 380a in a clear optical state. Electro-optical display 380a includes a first substrate 102, a dielectric layer 104 including recess regions 105, first electrodes 322 and 324, a display cell 108, a second electrode 110, and a second substrate 112. Display cell 108 is filled with a carrier fluid with colorant particles 326 and 328. Charged colorant particles 326 and 328 in dual colorant ink are oppositely charged and each provides a different color, such as cyan and magenta. First electrode 322 is used to control the movement of colorant particles 326, and first electrode 324 is used to control the movement of colorant particles 328.

In the clear optical state, a positive bias is applied to first electrode 322 and a negative bias is applied to first electrode 324 relative to a reference bias applied to second electrode 110. The positive bias applied to first electrode 322 attracts negatively charged colorant particles 326 to compact on the surface of first electrode 322. The negative bias applied to first electrode 324 attracts positively charged colorant particles 328 to compact on the surface of first electrode 324. With colorant particles 326 and 328 compacted in recess regions 105, the clear optical state is achieved.

Figure 8B:
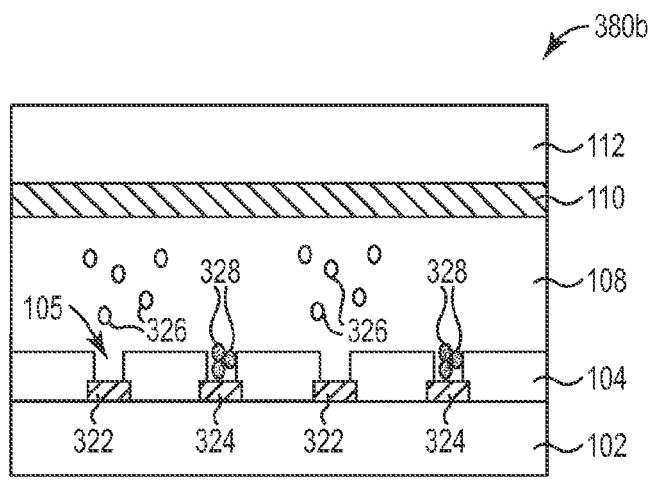
FIG. 8B illustrates a cross-sectional view of one embodiment of an electro-optical display in a first color optical state.

FIG. 8B illustrates a cross-sectional view of one embodiment of an electro-optical display 380b in a first color optical state. In the first color optical state, pulses are applied to first electrode 322 and a negative bias is applied to first electrode 324 relative to a reference bias applied to second electrode 110. The pulses applied to first electrode 322 spread negatively charged colorant particles 326 within display cell 108. The amount of spreading of colorant particles 326 is controlled based on the pulses to provide a desired grayscale for colorant particles 326. The negative bias applied to first electrode 324 attracts positively charged colorant particles 328 to compact on the surface of first electrode 324. With colorant particles 326 spread in display cell 108 and colorant particles 328 compacted in recess regions 105, the first color optical state having the color of colorant particles 326 is achieved.

Figure 8C:
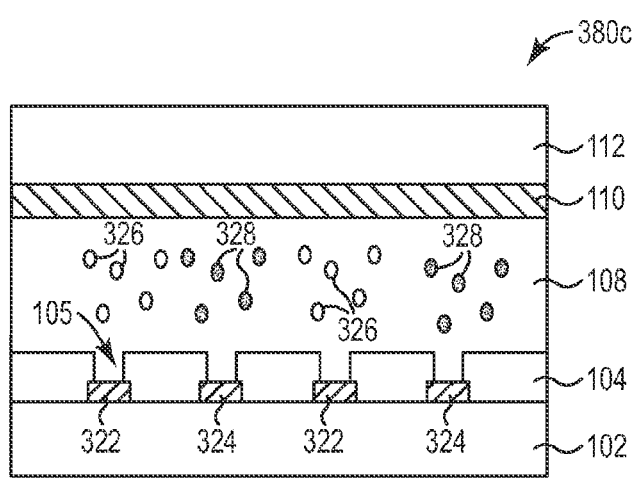
FIG. 8C illustrates a cross-sectional view of one embodiment of an electro-optical display in a second color optical state.

FIG. 8C illustrates a cross-sectional view of one embodiment of an electro-optical display 380c in a second color optical state. In the second color optical state, pulses are applied to first electrode 322 and first electrode 324 relative to a reference bias applied to second electrode 110. The pulses applied to first electrode 322 spread negatively charged colorant particles 326 within display cell 108. The amount of spreading of colorant particles 326 is controlled based on the pulses to provide a desired grayscale for colorant particles 326. The pulses applied to first electrode 324 spread positively charged colorant particles 328 within display cell 108. The amount of spreading of colorant particles 328 is controlled based on the pulses to provide a desired grayscale for colorant particles 328. With colorant particles 326 and 328 spread in display cell 108, the second color optical state having the color of a combination of colorant particles 326 and 328 is achieved.

Figure 9:
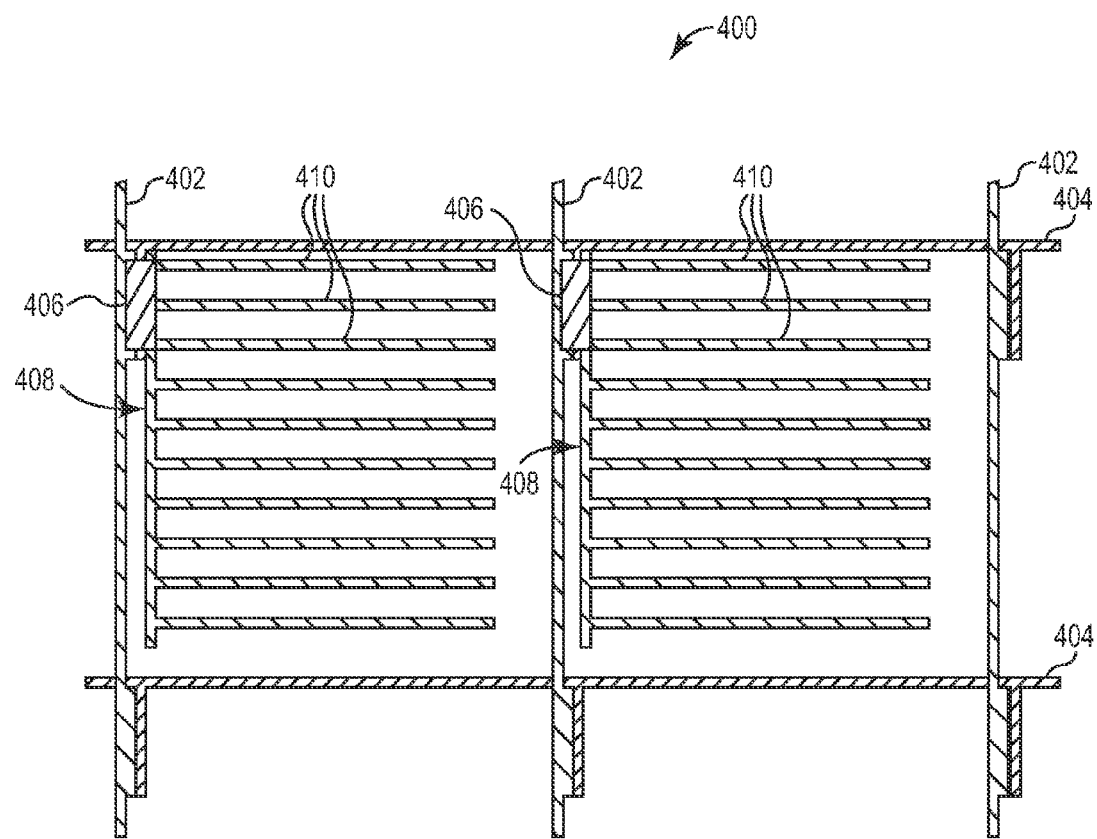
FIG. 9 illustrates a top view of one embodiment of a pixelated electro-optical display.

FIG. 9 illustrates a top view of one embodiment of a pixelated electro-optical display 400. Electro-optical display 400 is a single color per pixel display. Electro-optical display 400 includes data lines 402, control lines 404, transistors or switches 406, and electrodes 408. In one embodiment, data lines 402 and control lines 404 are conductive lines. In one embodiment, transistors or switches 406 are thin film transistors.

Each electrode 408 includes a plurality of conductive lines 410 to provide one pixel of electro-optical display 400. While two pixels are illustrated in FIG. 9, electro-optical display 400 can include any suitable number of pixels including any suitable number of rows of pixels and any suitable number of columns of pixels. In one embodiment, conductive lines 410 provide first electrode 106 previously described and illustrated with reference to FIGS. 1A-1C. Each electrode 408 is individually activated through a respective transistor or switch 406 based on signals applied to data lines 402 and control lines 404. In this way, each individual pixel of electro-optical display 400 can be controlled to provide a desired image.

Figure 10:
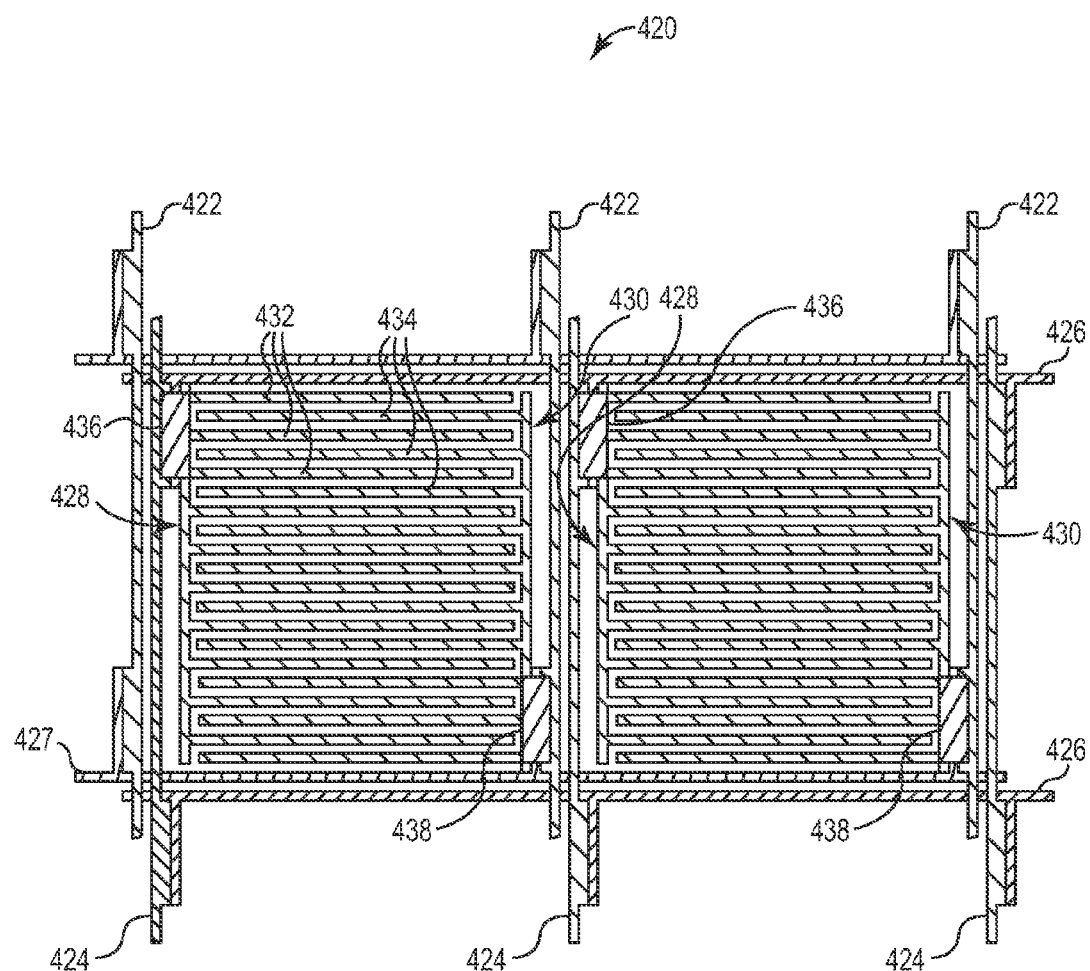
FIG. 10 illustrates a top view of another embodiment of a pixelated electro-optical display.

FIG. 10 illustrates a top view of another embodiment of a pixelated electro-optical display 420. Electro-optical display 420 is a dual color per pixel display. Electro-optical display 420 includes first color data lines 424, second color data lines 422, first color control lines 426, second color control lines 427, transistors or switches 436 and 438, first color electrodes 428, and second color electrodes 430. In one embodiment, data lines 424 and 422 and control lines 426 and 427 are conductive lines. In one embodiment, transistors or switches 436 and 438 are thin film transistors.

Each first color electrode 428 includes a plurality of conductive lines 432 for controlling the movement of one colorant of each pixel of electro-optical display 400. Each second color electrode 430 includes a plurality of conductive lines 434 to control the movement of another colorant of each pixel of electro-optical display 400. Conductive lines 432 and conductive lines 434 are interdigitated. In one embodiment, conductive lines 432 provide first electrode 322 and conductive lines 434 provide first electrode 324 previously described and illustrated with reference to FIGS. 8A-8C.

Each electrode 428 is individually activated through a respective transistor or switch 436 based on signals applied to data lines 424 and control lines 426. Each electrode 430 is individually activated through a respective transistor or switch 438 based on signals applied to data lines 422 and control lines 427. In this way, each individual colorant of each individual pixel of electro-optical display 420 can be controlled to provide a desired image.

Figure 11A:
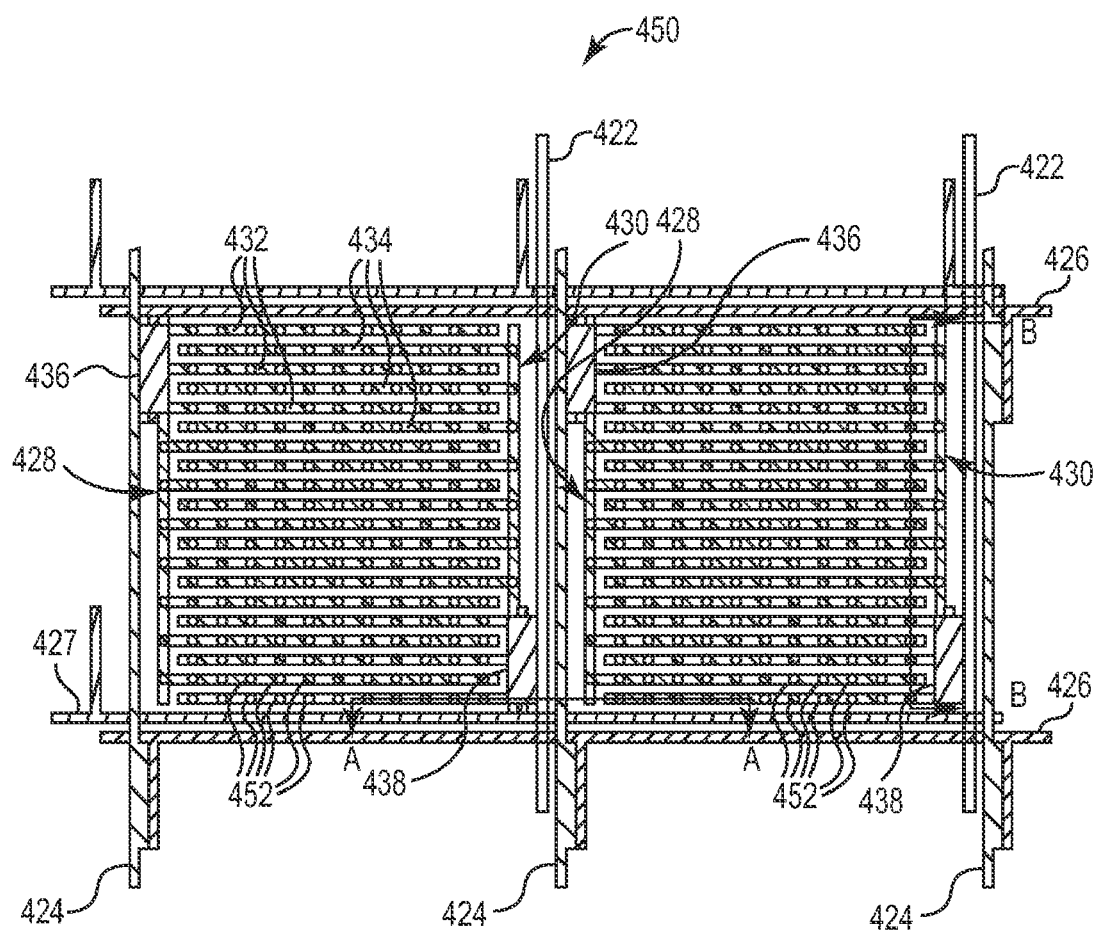
FIG. 11A illustrates a top view of another embodiment of a pixelated electro-optical display.
Figure 11B:
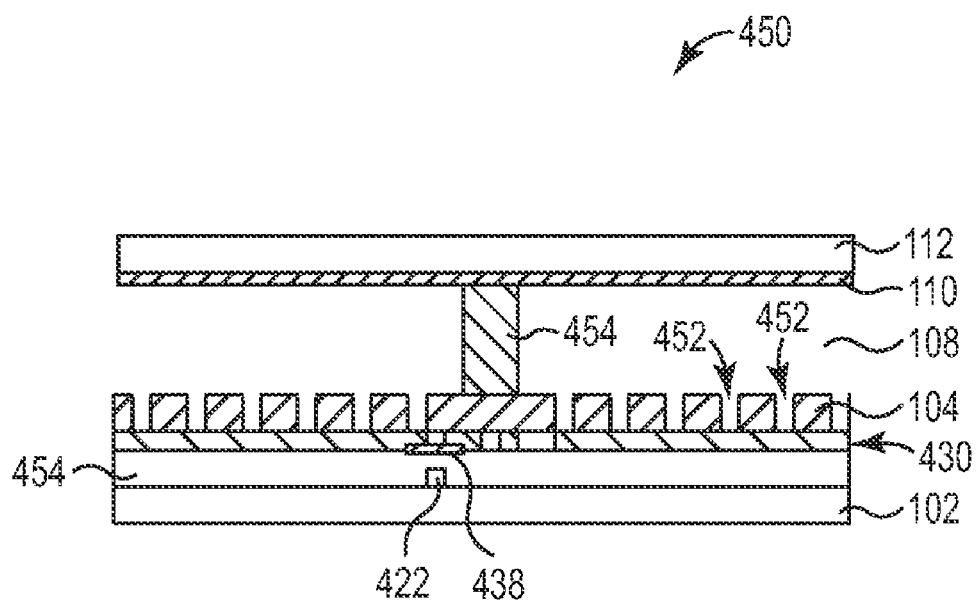
FIG. 11B illustrates a first cross-sectional view of the pixelated electro-optical display illustrated in FIG. 11A.
Figure 11C:
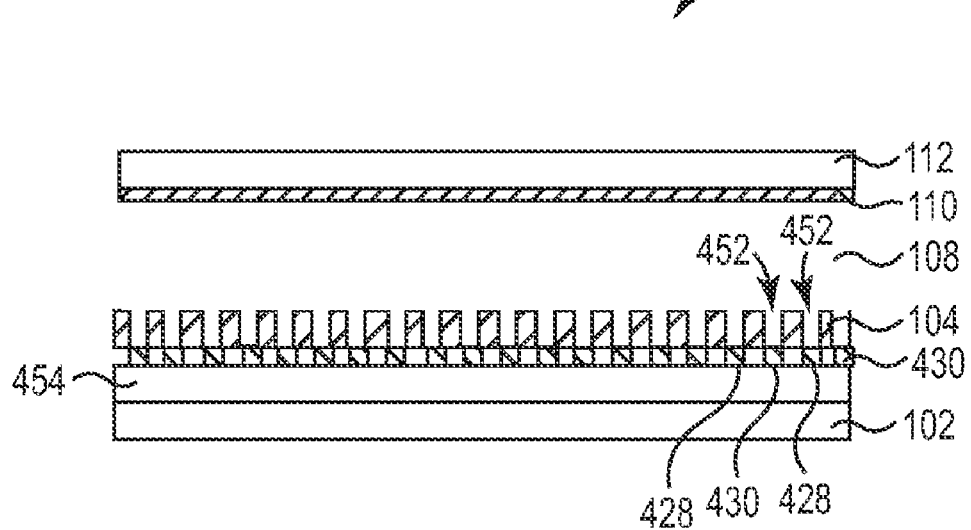
FIG. 11C illustrates a second cross-sectional view of the pixelated electro-optical display illustrated in FIG. 11A.

FIG. 11A illustrates a top view of one embodiment of a pixelated electro-optical display 450. FIG. 11B illustrates a first cross-sectional view of pixelated electro-optical display 450 illustrated in FIG. 11A taken along A-A. FIG. 11C illustrates a second cross-sectional view of pixelated electro-optical display 450 illustrated in FIG. 11A taken along B-B. Electro-optical display 450 is similar to electro-optical display 420 previously described and illustrated with reference to FIG. 10, except that electro-optical display 450 includes dot regions 452 along conductive lines 432 and 434.

As illustrated in FIGS. 11B and 11C, electro-optical display 450 also includes a first substrate 102, a dielectric layer 454, a dielectric layer 104 including recess regions 452 for the dot regions, dielectric containment walls 454, top electrode 110, a second substrate 112, and display cells 108. Each display cell 108 between containment walls 454 includes a carrier fluid with dual colorant particles to define each pixel of electro-optical display 450. Electro-optical display 450 operates similarly to electro-optical display 420 previously described and illustrated with reference to FIG. 10.

Figure 12:
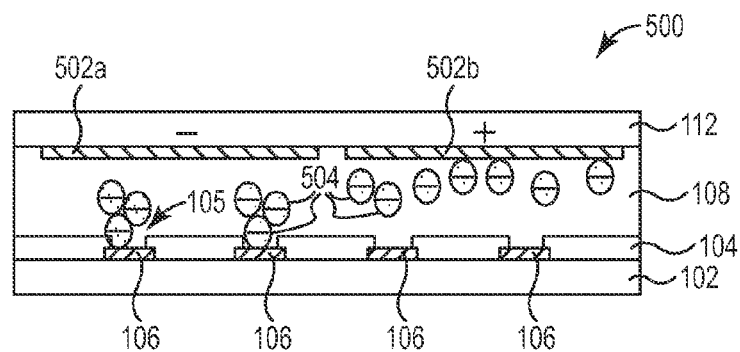
FIG. 12 illustrates a cross-sectional view of another embodiment of an electro-optical display.

FIG. 12 illustrates a cross-sectional view of another embodiment of an electro-optical display 500. Electro-optical display 500 includes a first substrate 102, a first electrode 106, dielectric material 104 with recess regions 105, a display cell 108, second electrodes 502a and 502b, and a second substrate 112. Display cell 108 is filled with a carrier fluid with negatively charged colorant particles 504. First electrode 106 includes conductive lines, a conductive mesh, or a conductive lattice and second electrodes 502a and 502b are blanket or plate transparent conductors. In this embodiment, a reference bias is applied to first electrode 106 and each second electrode 502a and 502b is individually controlled for controlling the movement of colorant particles 504.

To provide a clear optical state as illustrated in a portion of display cell 108, a negative bias is applied to second electrode 502a relative to the reference bias applied to first electrode 106. With the negative bias applied to second electrode 502a relative to the reference bias applied to first electrode 106, negatively charged colorant particles 504 are attracted by first electrode 106 to compact in recess regions 105. To provide a spread optical state as illustrated in another portion of display cell 108, a positive bias is applied to second electrode 502b relative to the reference bias applied to first electrode 106. With the positive bias applied to second electrode 502b relative to the reference bias applied to first electrode 106, negatively charged colorant particles 504 are attracted by second electrode 502b and are spread over second electrode 502b.

Figure 13:
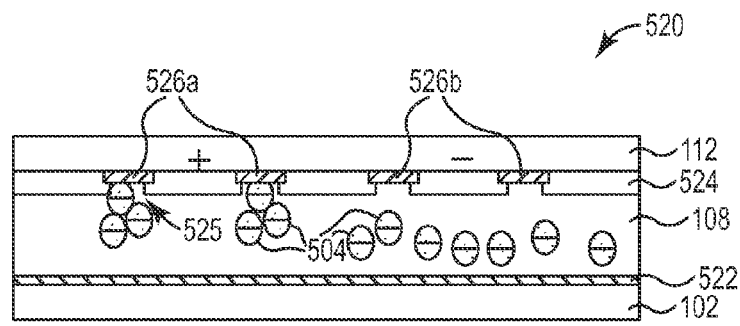
FIG. 13 illustrates a cross-sectional view of another embodiment of an electro-optical display.

FIG. 13 illustrates a cross-sectional view of another embodiment of an electro-optical display 520. Electro-optical display 520 includes a first substrate 102, a first electrode 522, dielectric material 524 with recess regions 525, a display cell 108, second electrodes 526a and 526b, and a second substrate 112. Display cell 108 is filled with a carrier fluid with negatively charged colorant particles 504. First electrode 522 is a blanket transparent conductor and second electrodes 526a and 526b include conductive lines, a conductive mesh, or a conductive lattice. In this embodiment, a reference bias is applied to first electrode 522 and each second electrode 526a and 526b is individually controlled for controlling the movement of colorant particles 504.

To provide a clear optical state as illustrated in a portion of display cell 108, a positive bias is applied to second electrode 526a relative to the reference bias applied to first electrode 522. With the positive bias applied to second electrode 526a relative to the reference bias applied to first electrode 522, negatively charged colorant particles 504 are attracted by second electrode 526a to compact in recess regions 525. To provide a spread optical state as illustrated in another portion of display cell 108, a negative bias is applied to second electrode 526b relative to the reference bias applied to first electrode 522. With the negative bias applied to second electrode 526b relative to the reference bias applied to first electrode 522, negatively charged colorant particles 504 are attracted by first electrode 522 and are spread in display cell 108 between first electrode 522 and second electrode 526b.

Figure 14:
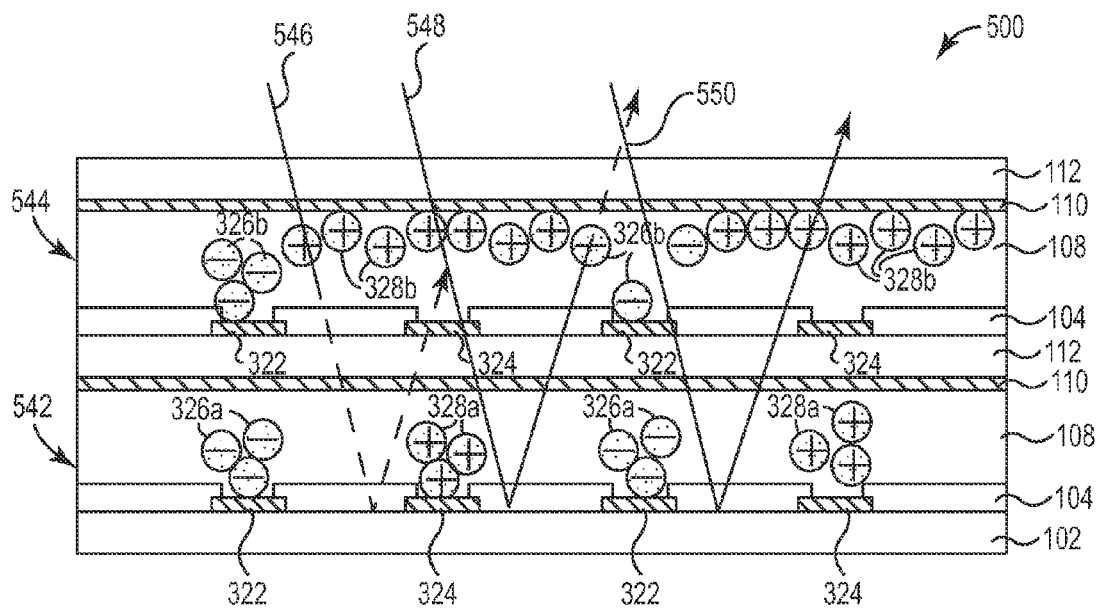
FIG. 14 illustrates a cross-sectional view of one embodiment of a full color electro-optical display.

FIG. 14 illustrates a cross-sectional view of one embodiment of a full color electro-optical display 540. Electro-optical display 540 includes a dual layer stack including display element layers 542 and 544. Each layer 542 and 544 is similar to electro-optical display 380a previously described and illustrated with reference to FIG. 8A. Layer 542 includes a first dual colorant ink (e.g., magenta and black), and layer 544 includes a second dual colorant ink (e.g., cyan and yellow). In this embodiment, first substrate 102 is reflective or includes a reflective layer. In one embodiment, the reflective layer is white. The bias applied to first electrodes 322 and 324 of first layer 542 and second layer 544 can be individually controlled as previously described and illustrated with reference to FIGS. 8A-8C. By controlling the bias applied to the electrodes, the movement of the first and second dual colorant inks of electro-optical display 540 can be controlled to display desired colors as indicated at 546, 548, and 550.

Figure 15:
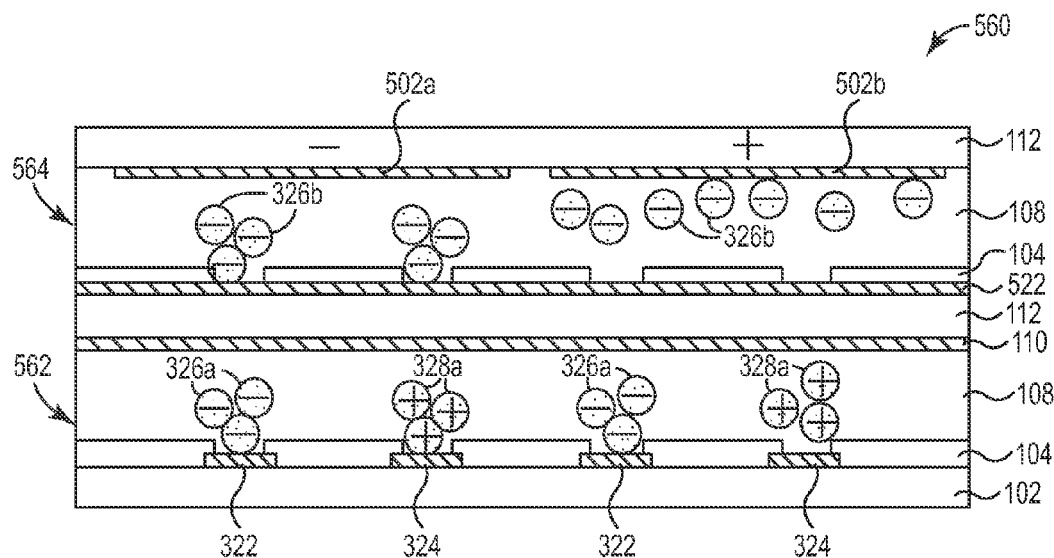
FIG. 15 illustrates a cross-sectional view of another embodiment of a full color electro-optical display.

FIG. 15 illustrates a cross-sectional view of another embodiment of a full color electro-optical display 560. Electro-optical display 560 includes a dual layer stack including display element layers 562 and 564. Layer 562 is similar to electro-optical display 308a previously described and illustrated with reference to FIG. 8A. Layer 564 is similar to electro-optical display 500 previously described and illustrated with reference to FIG. 12, except that in layer 564 first electrode 106 is replaced by first electrode 522. First electrode 522 is a blanket transparent conductor.

Layer 562 includes a dual colorant ink (e.g., magenta and cyan), and layer 564 includes a single colorant ink (e.g., yellow). In this embodiment, first substrate 102 is reflective or includes a reflective layer. In one embodiment, the reflective layer is white. The bias applied to first electrodes 322 and 324 of first layer 542 and to second electrodes 502a and 502b of second layer 564 can be individually controlled as previously described and illustrated with reference to FIGS. 8A-8C and 12, respectively. By controlling the bias applied to the electrodes, the movement of the dual colorant ink and the single colorant ink of electro-optical display 560 can be controlled to display desired colors.

Figure 16:
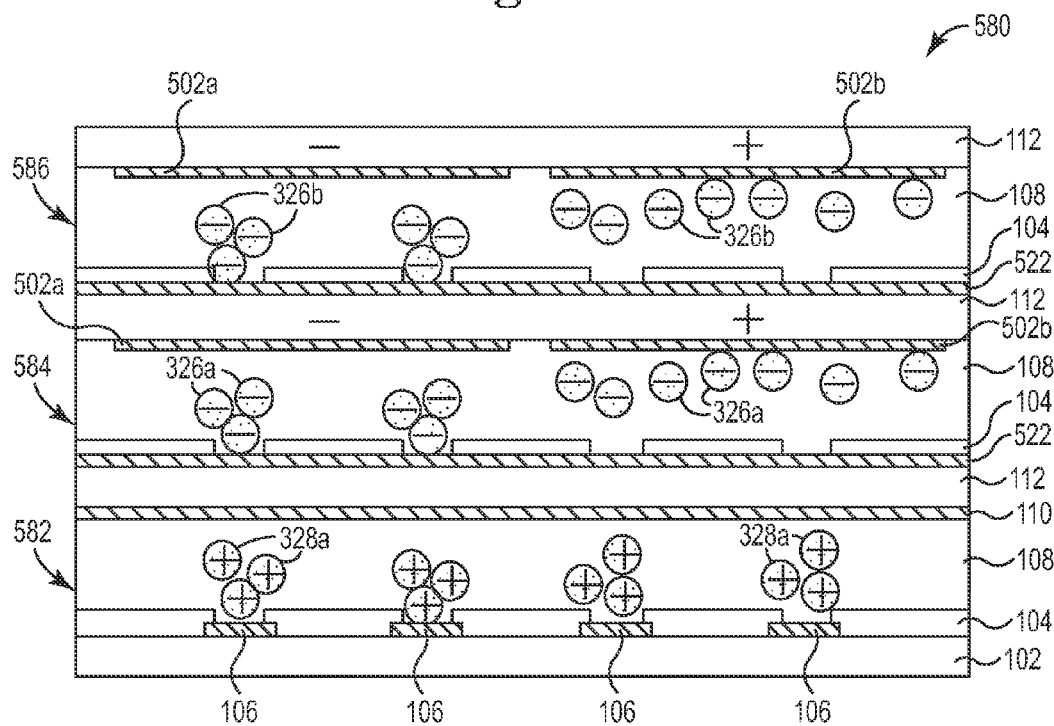
FIG. 16 illustrates a cross-sectional view of another embodiment of a full color electro-optical display.

FIG. 16 illustrates a cross-sectional view of another embodiment of a full color electro-optical display 580. Electro-optical display 580 includes a three layer stack including display element layers 582, 584, and 586. Layer 582 is similar to electro-optical display 100a previously described and illustrated with reference to FIG. 1A. Layers 584 and 586 are similar to electro-optical display 500 previously described and illustrated with reference to FIG. 12, except that in layers 584 and 586 first electrode 106 is replaced by first electrode 522. First electrode 522 is a blanket transparent conductor.

Layer 582 includes a single colorant ink (e.g., magenta), layer 584 includes a single colorant ink (e.g., cyan), and layer 586 includes a single colorant ink (e.g., yellow). In this embodiment, first substrate 102 is reflective or includes a reflective layer. In one embodiment, the reflective layer is white. The bias applied to first electrode 106 of layer 582 and to second electrodes 502a and 502b of layers 584 and 586 can be individually controlled as previously described and illustrated with reference to FIGS. 1A and 12, respectively. By controlling the bias applied to the electrodes, the movement of the single colorant ink within each layer of electro-optical display 580 can be controlled to display desired colors.

By using conductive lines, meshes, or lattices in electro-optical displays, the flexibility and robustness of the electrode layer is improved, which increases the overall display reliability. In addition, using conductive lines for gate electrodes can reduce shorting between the gate and reservoir electrodes since the gate electrode can be defined around the reservoir openings. Line electrodes also enable independent control of dual colorant inks by utilizing exposed dots on separate line electrodes. The exposed dots can be arranged in regular patterns that are optimized for the given spacial frequency of electro-convection to provide optimal switching and compaction for both colorants.

Further, by using conductive lines, meshes, or lattices in place of blanket transparent electrodes, the substrate can be index matched to the dielectric layer. Typically, the index of electronic ink is relatively close to that of the substrate so that the addition of a transparent electrode introduces an index discontinuity, which can contribute to optical loss. Since optical loss increases as the number of transparent electrode layers increases in a stacked architecture, the use of conductive lines, meshes, or lattices in place of transparent electrode layers removes this constraint in the overall design. Therefore, the conductive line, mesh, or lattice electrodes enhance the overall performance of the electro-optical display, thus enabling a highly performing stacked architecture.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A display element comprising:
   a first electrode comprising conductive lines;
   a second electrode;
   a dielectric layer on the first electrode, the dielectric layer having recess regions therein exposing at least portions of the conductive lines; and
   a fluid with colorant particles between the first electrode and the second electrode,
   wherein each conductive line comprises discrete first regions and discrete second regions, each first region having a greater cross-sectional width than each second region, the first regions along each conductive line spaced apart from each other by the second regions, each first region aligned with a corresponding recess region,
   wherein the first regions along two directly adjacent conductive lines are offset from each other.

2. The display element of claim 1, wherein the conductive lines form a mesh pattern, a lattice pattern, or an aperiodic arrangement.

3. The display element of claim 1, further comprising:
   a third electrode comprising conductive lines, the conductive lines of the third electrode interdigitated with the conductive lines of the first electrode.

4. The display element of claim 3, further comprising:
   a first thin film transistor configured to selectively activate the first electrode; and
   a second thin film transistor configured to selectively activate the third electrode.

5. The display element of claim 3, wherein the colorant particles comprise colorant particles of two different colors, the different colored colorant particles having opposite polarities.

6. The display element of claim 1, wherein each first region comprises one of a solid diamond shaped region, a solid circular shaped region with a single triangular portion removed, a solid circular shaped region with four triangular portions removed, a solid triangular shaped region, and a solid hexagon shaped region.

7. The display element of claim 1, wherein the conductive lines are made of one of a metal, silver nanowires, and carbon nanotubes.

8. A display element comprising:
   a first electrode comprising conductive lines;
   a second electrode;
   a dielectric layer on the first electrode, the dielectric layer having recess regions therein exposing at least portions of the conductive lines; and
   a fluid with colorant particles between the first electrode and the second electrode,
   wherein each conductive line comprises discrete first regions and discrete second regions, each first region having a greater cross-sectional width than each second region, the first regions along each conductive line spaced apart from each other by the second regions, each first region aligned with a corresponding recess region, and
   a gate electrode on the dielectric layer, the gate electrode comprising conductive ring regions and conductive line regions between the conductive ring regions, each ring region surrounding a corresponding recess region and aligned with a corresponding first region.

9. The display element of claim 8, wherein the gate electrode is passivated.

10. The display element of claim 8, wherein the first regions along two directly adjacent conductive lines are aligned.

11. The display element of claim 8, wherein the first regions along two directly adjacent conductive lines are offset from each other.

12. A display comprising:
    a first display element comprising:
    a first electrode comprising non-transparent conductive lines;
    a second electrode;
    a dielectric layer on the first electrode, the dielectric layer having recess regions therein exposing at least portions of the conductive lines;
    a fluid with colorant particles between the first electrode and the second electrode, the colorant particles having a first color; and
    a gate electrode on the dielectric layer, the gate electrode comprising conductive ring regions and conductive line regions between the conductive ring regions, each ring region surrounding a corresponding recess region and aligned with a portion of the first electrode; and
    a second display element stacked on the first display element, the second display element comprising colorant particles having a second color different from the first color.

13. The display of claim 12, wherein the first display element and the second display element provide a dual color display or a full color display.

14. The display of claim 12, wherein the first display element further comprises:
    a third electrode comprising non-transparent conductive lines, the conductive lines of the third electrode interdigitated with the conductive lines of the first electrode,
    wherein the colorant particles comprise colorant particles of two different colors including the first color and a third color, the different colored colorant particles having opposite charge polarities, the third color different from the second color.

15. The display of claim 12, further comprising:
    a third display element stacked on the second display element, the third display element comprising colorant particles having a third color different from the first color and the second color.

16. A method for fabricating a display element, the method comprising:
    providing a substrate;
    forming a first electrode comprising metal lines on the substrate;
    forming a dielectric layer on the first electrode and the substrate, the dielectric layer having recess regions therein exposing at least portions of the metal lines;
    providing a second electrode opposite the first electrode;
    filling a space between the first electrode and the second electrode with a fluid with colorant particles; and
    forming a gate electrode comprising metal lines on the dielectric layer, wherein each metal line of the gate electrode comprises ring regions surrounding the recess regions and line regions between the ring regions.

17. The method of claim 16, wherein forming the first electrode comprises forming the first electrode comprising metal lines in a mesh or lattice arrangement on the substrate, and wherein the recess regions expose intersections of the metal lines.

18. The method of claim 16, wherein forming the first electrode comprises forming the first electrode comprising metal lines including solid dot regions, which are aligned with the recess regions, and line regions between the solid dot regions.

19. The method of claim 16, further comprising:
at least one of forming a first dielectric passivation layer over the first electrode in the recess regions and forming a second dielectric passivation layer over the second electrode.

* * * * *